UNITED STATES PATENT OFFICE.

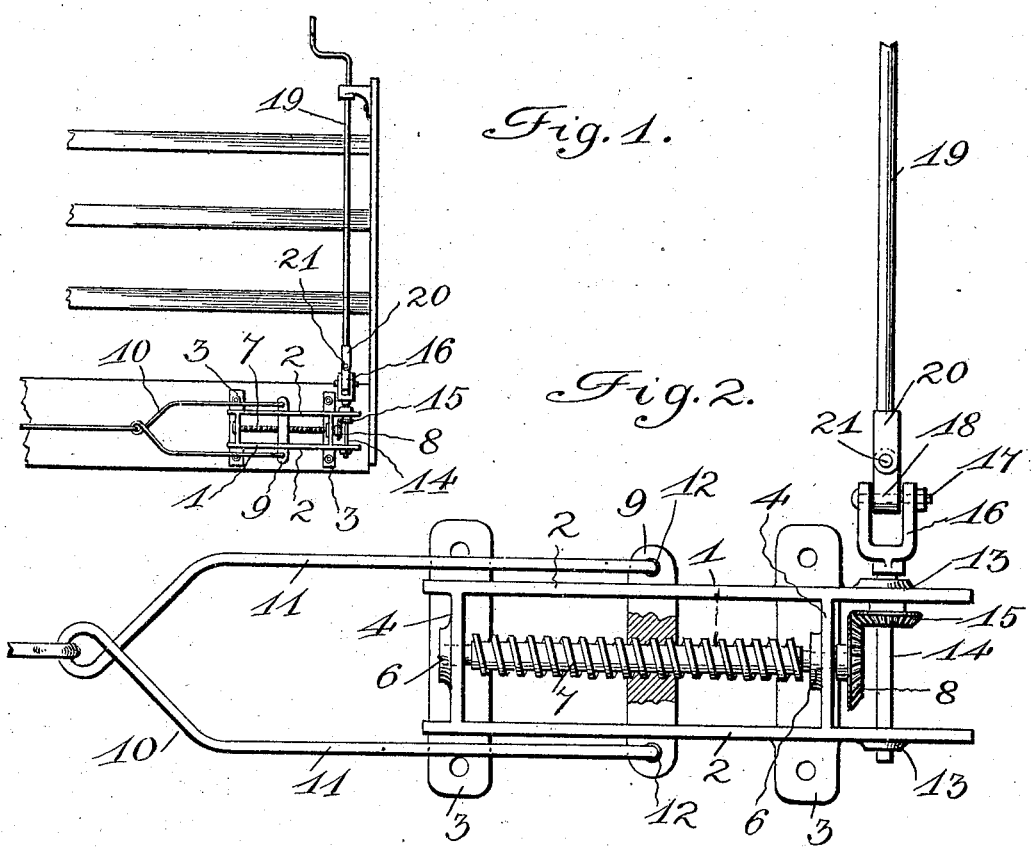

WILLIAM B. BROWN, OF LABADDIE, MISSOURI.

BRAKE APPLIANCE.

No. 806,237.        Specification of Letters Patent.        Patented Dec. 5, 1905.

Application filed June 8, 1905. Serial No. 264,328.

*To all whom it may concern:*

Be it known that I, WILLIAM B. BROWN, a citizen of the United States, residing at Labaddie, in the county of Franklin and State of Missouri, have invented certain new and useful Improvements in Brake Appliances; and I do declare the following to be a full, clear, and exact description of the invention, such as will enable others skilled in the art to which it appertains to make and use the same.

My invention is an improved brake appliance adapted for use for applying the brakes on a hay-wagon, threshing-machine, or other vehicle in which the driver is mounted at a considerable elevation; and it consists in the construction, combination, and arrangement of devices hereinafter described and claimed.

In the accompanying drawings, Figure 1 is a side elevation showing my improved brake appliance in operative position on a hay-rack. Fig. 2 is a detail elevation of my improved brake appliance. Fig. 3 is a bottom plan of the same, and Fig. 4 is a transverse sectional view of the same.

The frame 1, which is adapted to be secured on the side of a hay-rack, wagon-bed, wood-frame, threshing-machine, or the like, is here shown as comprising parallel sides 2, transverse base-plates 3, connecting them near their ends, and cross-bars 4, which also connect said sides and are disposed over said base-plates. The latter have their ends projecting beyond said sides and formed with openings to receive the bolts or other suitable devices which are employed to secure the said frame in place. Between the cross-bars 4 the sides are provided with longitudinal guide-slots 5. The cross-bars 4 are provided with bearings 6 for the journal portion of a screw-shaft 7. To one end of the said screw-shaft is secured a miter-gear 8. A follower 9 has a screw-threaded bore which is engaged by the threads of the screw-shaft, and the said follower projects through and is guided by the slots 5. A bail 10 has its arms 11 pivotally connected, as at 12, to the end portions of the said follower. The rod or other immediate operating device is attached to the said bail, and hence is operated thereby when the bail is moved by the follower 9. In the sides 2 of the frame 1, near one end of said frame, are bearings 13, in which is journaled a shaft 14, which is provided with a miter-gear 15, that engages the gear 8. Said shaft has a fork-head 16. The arms of the same are connected by a bolt 17, on which an arm 18 is pivoted. An operating-crank 19, of suitable length to extend to within convenient use of the driver of the vehicle, is provided at its lower end with a fork 20, which engages the outer end of the arm 18 and is pivotally connected thereto, as at 21. Hence the shaft 14 may be revolved, by means of the said crank, to turn the screw 7 and cause the latter to operate the follower in the manner and for the purpose hereinbefore stated.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

A brake-operating appliance of the class described comprising a frame for attachment to the body of a vehicle, and provided with guides, a follower to operate in said guides and having means whereby it may be connected to a brake, a screw-shaft journaled in said frame and engaging and operating said follower, a power-shaft also journaled in said frame and having a yoke-head, miter-gears connecting said power-shaft and screw-shaft, an arm pivotally connected to the yoke-head, and a crank pivotally connected to said arm.

In testimony whereof I have hereunto set my hand in presence of two subscribing witnesses.

W. B. BROWN.

Witnesses:
     W. P. DENIER,
     OTTO DREWEL.